United States Patent
Hiesse et al.

(10) Patent No.: US 9,168,945 B2
(45) Date of Patent: Oct. 27, 2015

(54) STEERING COLUMN COMPRISING AN IMPROVED DEPTH-BLOCKING MECHANISM

(75) Inventors: Olivier Hiesse, St avertin (FR); Mickael Sauquet, Villerable (FR); Laurent Fevre, Saint Sulpice (FR)

(73) Assignee: ROBERT BOSCH AUTOMOTIVE STEERING VENDOME (FR)

( * ) Notice: Subject to any disclaimer, the term of this patent is extended or adjusted under 35 U.S.C. 154(b) by 0 days.

(21) Appl. No.: 14/344,613

(22) PCT Filed: Jul. 18, 2012

(86) PCT No.: PCT/FR2012/051706
§ 371 (c)(1),
(2), (4) Date: Apr. 16, 2014

(87) PCT Pub. No.: WO2013/038079
PCT Pub. Date: Mar. 21, 2013

(65) Prior Publication Data
US 2014/0352479 A1     Dec. 4, 2014

(30) Foreign Application Priority Data

Sep. 14, 2011  (FR) ...................... 11 58181

(51) Int. Cl.
*B62D 1/18*     (2006.01)
*B62D 1/184*   (2006.01)
*B62D 1/187*   (2006.01)
*B62D 1/16*     (2006.01)

(52) U.S. Cl.
CPC  *B62D 1/184* (2013.01); *B62D 1/16* (2013.01); *B62D 1/18* (2013.01); *B62D 1/187* (2013.01)

(58) Field of Classification Search
CPC .......... B62D 1/18; B62D 1/184; B62D 1/185; B62D 1/187
See application file for complete search history.

(56) References Cited

U.S. PATENT DOCUMENTS 4,335,625 A * 6/1982 Nishikawa ...................... 74/493
5,461,937 A * 10/1995 Cymbal ........................... 74/493

(Continued)

FOREIGN PATENT DOCUMENTS

DE  19805289   8/1998
EP  0900943    3/1999

(Continued)

OTHER PUBLICATIONS

International Search Report for corresponding application PCT/FR2012/051706 filed Jul. 18, 2012; Mail date Oct. 25, 2012.

*Primary Examiner* — Paul N Dickson
*Assistant Examiner* — Barry Gooden, Jr.
(74) *Attorney, Agent, or Firm* — Cantor Colburn LLP

(57) ABSTRACT

A steering column including an upper body, two connection flanges for connecting the upper body to a support element, and a tightening and blocking device the upper body in position on an internal tube, where the tightening and blocking device includes a clamp screw extending through the flanges, a set of cams comprising a fixed cam and a movable cam mounted such that it can move freely in translation along the clamp screw and arranged so that it can bear on one of the flanges, a rack capable of cooperating with a notched arrangement provided on the other flange, and a resilient means arranged between the movable cam and the rack in order to exert a return force on the rack in the direction of the notched flange.

10 Claims, 4 Drawing Sheets

(56) References Cited

U.S. PATENT DOCUMENTS

| | | | |
|---|---|---|---|
| 5,555,772 A * | 9/1996 | Schneider | 74/493 |
| 5,687,990 A * | 11/1997 | Uphaus | 280/775 |
| 5,743,150 A * | 4/1998 | Fevre et al. | 74/493 |
| 5,787,759 A * | 8/1998 | Olgren | 74/493 |
| 5,988,679 A * | 11/1999 | Schelling et al. | 280/775 |
| 6,092,957 A * | 7/2000 | Fevre et al. | 403/373 |
| 6,138,525 A * | 10/2000 | Riefe et al. | 74/493 |
| 6,419,269 B1 * | 7/2002 | Manwaring et al. | 280/775 |
| 2004/0041387 A1 * | 3/2004 | Lutz | 280/775 |
| 2004/0057786 A1 * | 3/2004 | Heiml | 403/373 |
| 2004/0159173 A1 * | 8/2004 | Sawada | 74/492 |
| 2005/0076736 A1 * | 4/2005 | Sato | 74/493 |
| 2005/0081674 A1 * | 4/2005 | Nishioka et al. | 74/493 |
| 2005/0145056 A1 * | 7/2005 | Maida et al. | 74/493 |
| 2008/0150269 A1 * | 6/2008 | Longo | 280/775 |
| 2008/0150270 A1 * | 6/2008 | Longo | 280/775 |
| 2009/0229399 A1 * | 9/2009 | Ozsoylu et al. | 74/493 |
| 2013/0174684 A1 * | 7/2013 | Burns | 74/493 |
| 2013/0205935 A1 * | 8/2013 | Buzzard et al. | 74/495 |

FOREIGN PATENT DOCUMENTS

| | | |
|---|---|---|
| EP | 2100795 | 9/2009 |
| EP | 2100796 | 9/2009 |

* cited by examiner

STEERING COLUMN COMPRISING AN IMPROVED DEPTH-BLOCKING MECHANISM

TECHNICAL FIELD

The invention relates to an adjustable vehicle steering column.

The steering column according to the invention is intended in particular but not exclusively for a motor vehicle.

BACKGROUND

A steering column allows for the adjustment in depth and/or in height of the steering wheel. Conventionally per se, a steering column comprises a support element intended to be fixed to the chassis of the vehicle, an upper body mounted mobile in the support element, an internal tube mounted in the upper body and a tightening and blocking device the upper body in position on the internal tube. On known adjustable steering columns, the controlling of the tightening and blocking device is carried out by means of a control lever. The control lever makes it possible to place the tightening and blocking device in a locked position wherein the upper body is blocked in position on the internal tube and a unlocked position wherein the adjusting in depth and/or height of the steering column is authorized, as the upper body is no longer blocked in position on the internal tube.

In order to prevent the device for adjusting and blocking from moving during a collision of the vehicle with another vehicle or an obstacle, and consequently the position of the airbag during its deployment from not being provided, a mechanism is provided in steering columns that makes it possible to block the adjusting in depth of the steering column during the impact of the driver on the steering wheel during the collision.

Patent application EP2100795 and EP2100796 relate to steering columns comprising such a blocking mechanism. The blocking mechanism implemented comprises a toothed member cooperating with a notched arrangement provided on the upper body or the support element.

The mechanisms implemented in the steering columns described in the abovementioned documents have however a certain number of disadvantages. In particular, they generate an excessive effort on the control lever, with this excessive effort primarily observed when the toothed member is in contact with the notched arrangement provided on the upper body or the chassis element according to a tooth-on-tooth configuration. The excessive effort on the lever is furthermore sometimes such that it is impossible in certain cases to maneuver the control lever in order to place the device for adjusting and blocking in locked position. Furthermore, the blocking in depth of the upper body is no longer provided in this case.

BRIEF SUMMARY

The invention aims to overcome these problems by proposing a steering column comprising a mechanism for blocking in depth the upper body of which the blocking in depth is provided and the maneuverability of the control lever retained.

To this effect, and according to a first aspect, the invention proposes a steering column comprising an upper body defining a steering axis and wherein an internal tube is mounted, two connection flanges arranged on either side of the upper body and making it possible to connect the upper body to a support element able to be fixed to a vehicle chassis and a tightening and blocking device the upper body in position on the internal tube 4, the device comprising a clamp screw extending through the connection flanges according to a tightening axis perpendicular to the steering axis, a set of cams comprising a movable cam mounted such that it can move freely in translation along the clamp screw and a fixed cam, with the movable cam being arranged so that it can bear on the inner face of one of the connection flanges as well as a rack able to cooperate with a notched arrangement provided on the inner face of the other connection flange, with a resilient means being arranged between the movable cam and the rack in order to exert a return force on the rack in the direction of the notched connection flange.

The rack, the notched connection flange and the resilient means form an improved depth-blocking mechanism.

Indeed, the presence of a resilient means arranged as indicated hereinabove makes it possible to suppress the excessive effort imposed on the control lever of prior art. Indeed, the resilient means makes it possible to take over the control lever that has reached its locked position. As such, in the case of a tooth-on-tooth position of the rack with the notched arrangement of the connection flange, the effort is no longer exerted on the control lever, as the latter is generated by the resilient means. The maneuverability of the control lever, whether being the passing from the locked position to the unlocked position and inversely, is therefore improved.

Furthermore, the presence of the resilient means such as described hereinabove makes it possible to provide for the blocking in depth of the upper body, even in the case of a collision, due to the constant maintaining of a pressure on the rack in the direction of notched connection flange.

Inner faces of the connection flanges means the faces that are closest to the steering axis AA.

Advantageously, the movable cam and the rack comprise retaining means the resilient means in position between the movable cam and the rack.

According to an embodiment, the resilient means is a compression spring, which is arranged, more preferably, in order to exert a return force directed according to an axis substantially parallel to the tightening axis.

Advantageously, the movable cam and the rack comprise respectively a cam cone and a rack cone whereon the compression spring is mounted, the cam cone and the rack cone forming the retaining means the spring in position.

According to a particular configuration, the toothed member is provided with a maintaining pad in position the toothed member on the inner face of the other connection flange, with the maintaining pad bearing jointly on the internal tube and the upper body.

Advantageously, the movable cam is driven in rotation around the tightening axis by driving means arranged on the clamp screw. According to a particular embodiment, the driving means comprise at least one lug whereon the movable cam is mounted. According to another embodiment, the driving means comprise a splined zone whereon the movable cam is mounted.

Advantageously, the clamp screw is controlled by means of a lever. It can also be provided, that as a replacement for the tightening lever, the clamp screw be controlled by means of an electric motor.

BRIEF DESCRIPTION OF THE DRAWINGS

Other objects and advantages of the invention shall appear in the following description, made in reference to the annexed drawings, wherein.

DETAILED DESCRIPTION

Figure 1:
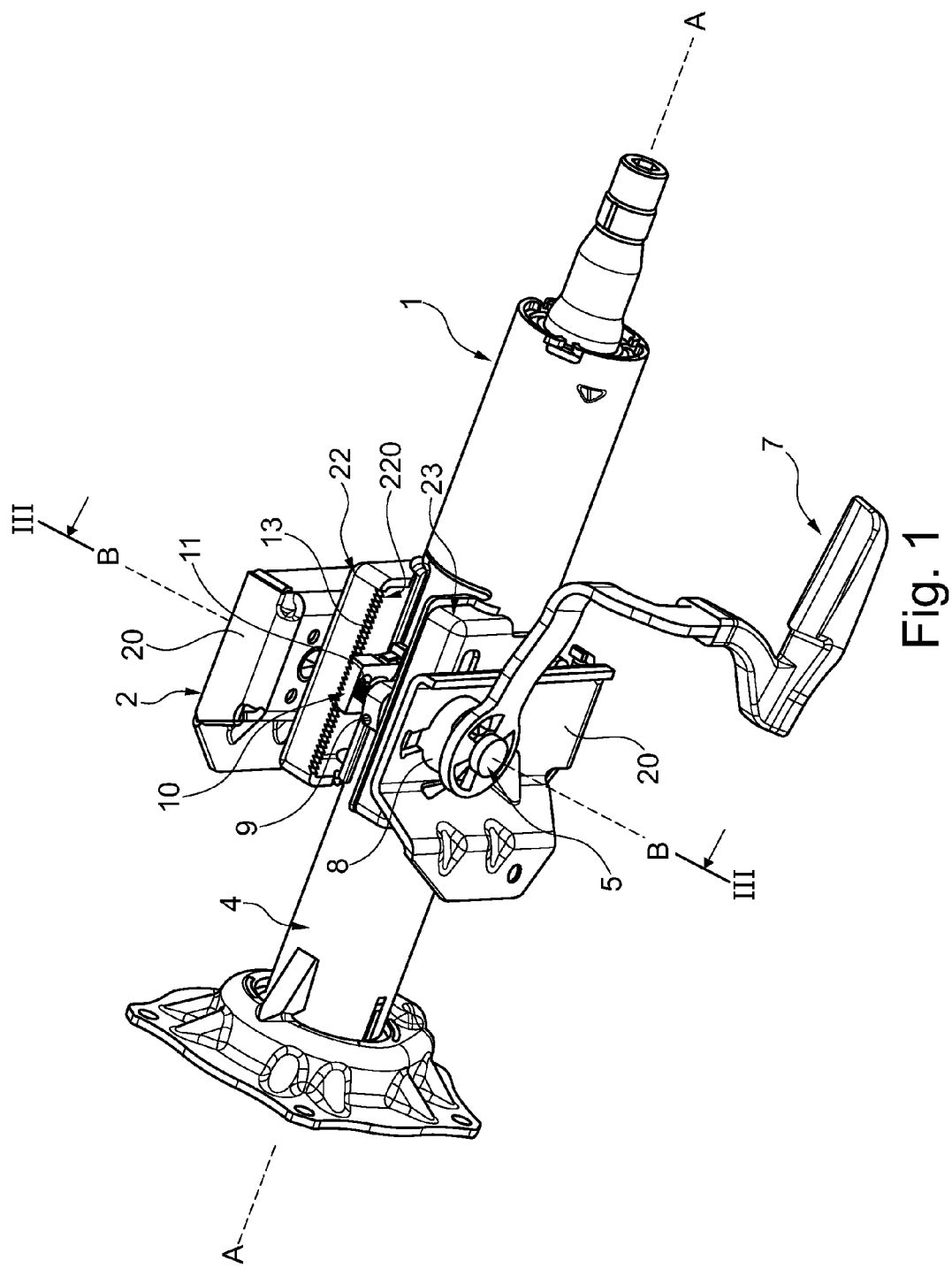
FIG. 1 shows a diagrammatical view in perspective of a steering column according to the invention.

In relation with FIGS. 1 to 4, a steering column is described comprising a support element 2 intended to be connected to the chassis of a vehicle and an upper body 1 defining a steering axis AA and mounted slidingly in the support element 2.

The upper body 1 is connected to the support element 2 by a tightening and blocking device the upper body 1 in position in relation to the support element 2. The device for tightening is able to take a locked position wherein the upper body 1 is blocked in the support element 2 and an unlocked position wherein the upper body 1 can slide in the support unit 2. Reference shall be made indifferently in what follows to tightening and blocking device, device for tightening or device for adjusting.

More particularly, the support element 2 is formed of a base provided with two lateral risers 20 arranged in order to be positioned on either side of the upper body 1. Each of the lateral risers 20 comprises a hole for the passage of a clamp screw 5 of the device for tightening. As shall be seen in what follows, the two lateral risers 20 constitute two tightening lugs bearing on either side of the upper body 1. In the embodiment described, the support unit 2 is of a single piece.

Figure 2:
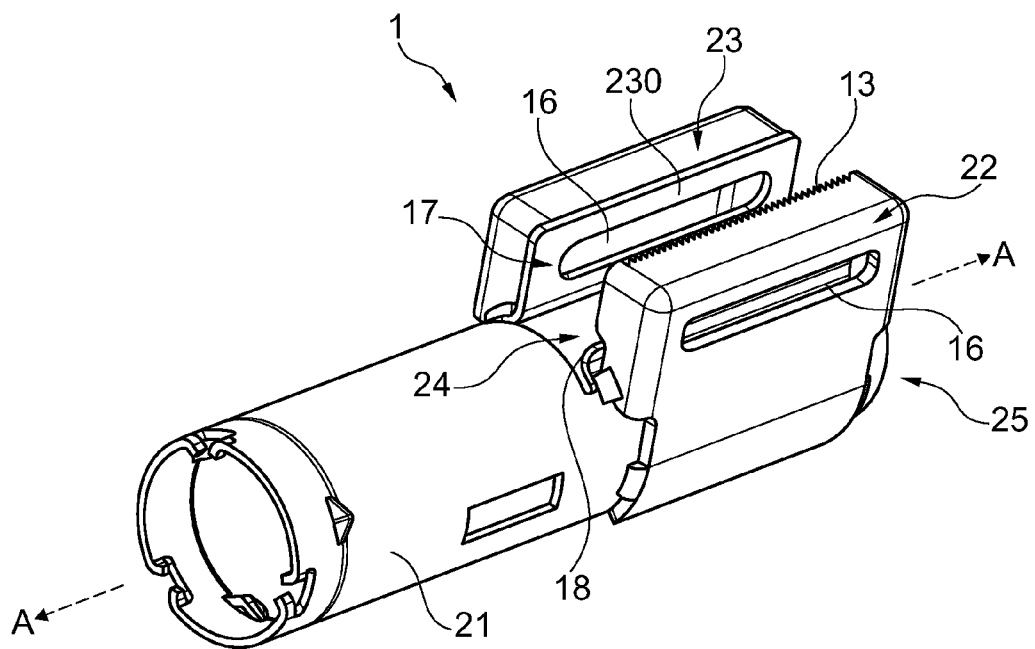
FIG. 2 shows a detailed view of the upper body of the steering column of FIG. 1.

The upper body 1, as shown in FIG. 2, comprises a tube 21 provided with a longitudinal opening 24 opening on one of its ends 25. The term longitudinal is defined in relation to the steering axis AA. As such, in this description, an element shall be defined as longitudinal when it extends according to an axis parallel to the steering axis AA, and as transverse when it extends according to an axis perpendicular to the steering axis AA.

Advantageously, the longitudinal edges of the tube 21 delimiting the opening 24 are arranged to form bearing planes. As shall be seen further on, the longitudinal edge 17 will constitute a bearing plane for a movable cam 9, the longitudinal edge 18 a bearing plane for a rack 10.

The upper body 1 further comprises two connection flanges 22, 23 fixed on either side of the longitudinal opening 24. In what follows, in reference to FIGS. 1 and 2, right connection flange will be used to refer to the flange designated by the reference 22, and left connection flange to refer to the flange designated by the reference 23.

The connection flanges 22, 23 are arranged facing each other and extend along the longitudinal opening 24 of the upper body 1. In the embodiment described, the connection flanges 22, 23 are welded onto the tube 21 of the upper body 1. Moreover, each of the connection flanges 22, 23 is provided with a longitudinal oblong slot 16 through which the clamp screw 5 of the device for tightening can extend.

The right connection flange 22 has an inner face 220, parallel to the bearing plane 17, provided with a notched arrangement (notching) extending over the length of said flange. This notched arrangement, as shall be seen further on, is intended to cooperate with a rack.

Figure 3:
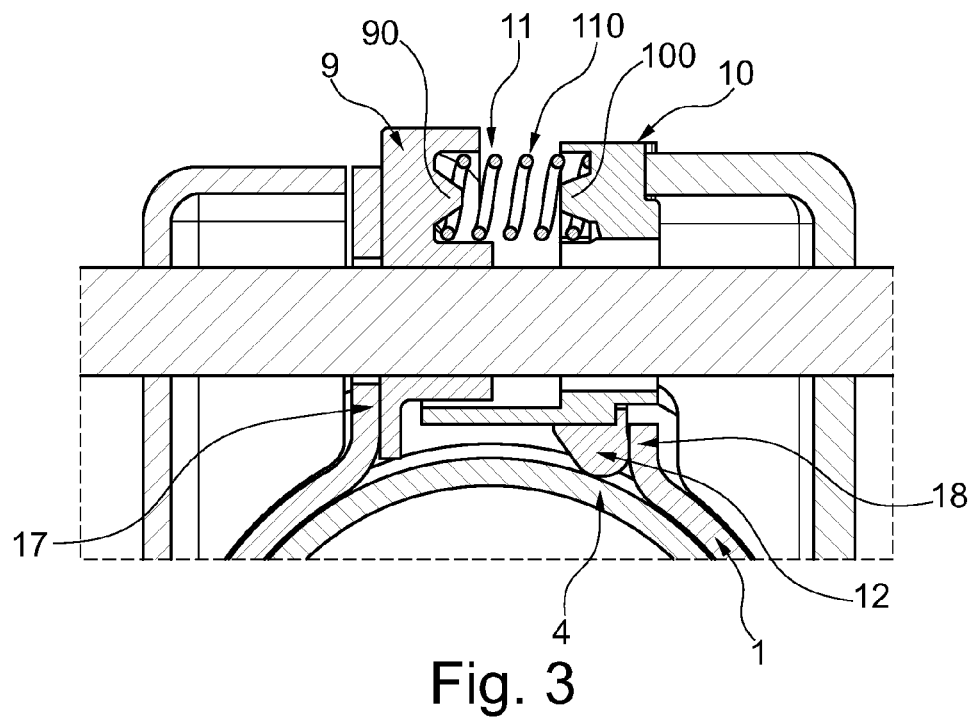
FIG. 3 shows a cross-section view of the steering column of FIG. 1 according to the transverse axis III-III corresponding to the tightening axis BB.
Figure 4:
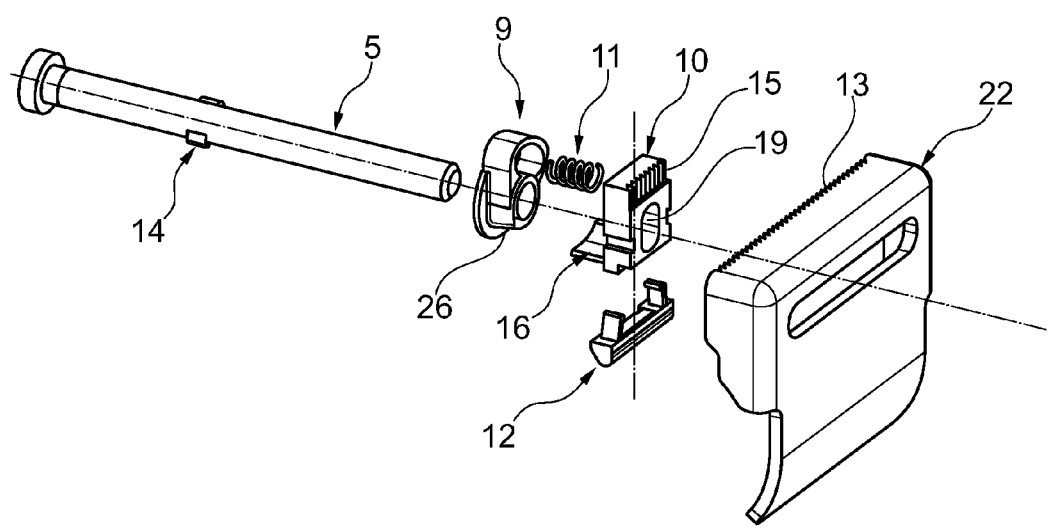
FIG. 4 shows an exploded and partial view of the tightening and blocking device the upper body shown in FIG. 1.

The tightening and blocking device comprises, as indicated hereinabove, a clamp screw 5. This clamp screw 5 is intended to extend through the support unit 2 and the upper body 1 according to a tightening axis BB perpendicular to the steering axis AA. The device for tightening further comprises a blocking unit with cams comprising a fixed cam 8 on the riser 20 bearing on the left connection flange 23 of the clamp screw 5 and free to rotate around the clamp screw 5 and a movable cam 9 mounted slidingly along the clamp screw 5. As shown in FIGS. 1 and 3, the movable cam 9 is mounted on the clamp screw 5 to bear against the bearing face 17 of the upper body 1.

In the embodiment shown, the controlling of the tightening and blocking device is carried out by means of a control lever 7. According to an alternative embodiment, it can be provided that the clamp screw 5 be controlled by means of an electric motor.

The tightening and blocking device further comprises a rack mounted slidingly along the clamp screw 5. In the embodiment described, the rack 10 comprises axial teeth 15 arranged in order to cooperate with the notched arrangement provided on the inner face 220 of the right connection flange 22 and having teeth 13 of a shape complementary with the teeth 15.

Advantageously, the rack 10 is provided with a maintaining pad 12 in position on the inner face of the right connection flange 22, with the maintaining pad 12 bearing jointly on the internal tube 4 and the raised edge 18 of the upper body 1. The pad 12 makes it possible to prevent the rotation of the rack 10 around the clamp screw 5 during the manipulation of the control lever 7 in order to pass from the unlocked position to the locked position and during the adjusting in depth of the upper body 1. The purpose is indeed to prevent the axial teeth 15 from angling away in relation to the teeth 13 of the right connection flange 22 during the unlocking of the control lever 7.

Figure 5:
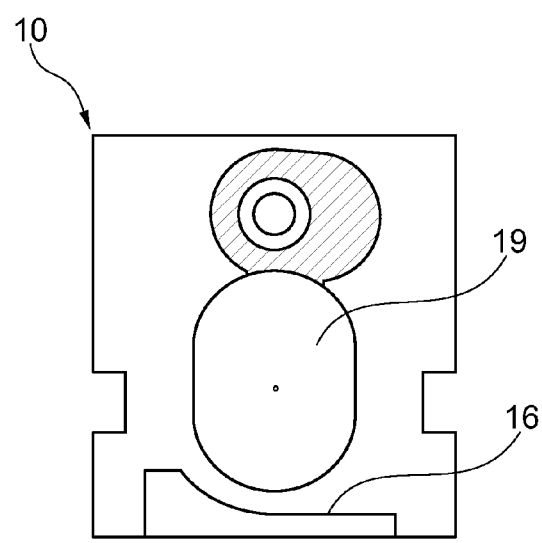
FIG. 5 shows a detailed view of the tightening and blocking device of FIG. 4.

The rack 10 further comprises a cam profile 16 associated with a contact surface 26 of the movable cam 9 in order to allow, as shall be seen further on, to tip the rack 10 and the pad 12 along the clamp screw 5 (FIG. 5).

According to the invention, a resilient means 11 is arranged between the movable cam 9 and the rack 10, with the resilient means 11 being arranged in order to exert on the rack 10 a return force in the direction of the notched arrangement of the connection flange. As shall be understood with the description given hereinafter the presence of the resilient means has for purpose to take over the control lever 7 in case of a tooth-on-tooth positioning of the rack 10 with the notched connection flange when the latter is placed in locked mode and therefore to provide for the blocking of the upper body 1 in the support element 2 in case of an impact of the driver on the steering column during a collision of the vehicle with an obstacle.

Figure 6:
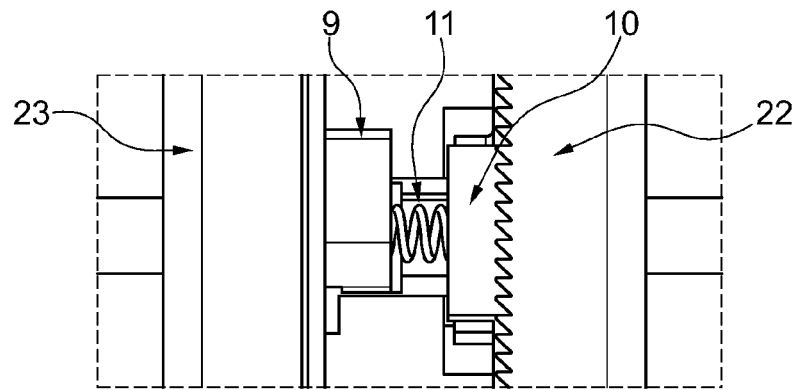
FIG. 6 shows the mechanism for blocking in depth having a complete meshing of the teeth when the tightening and blocking device is in locked position.
Figure 8:
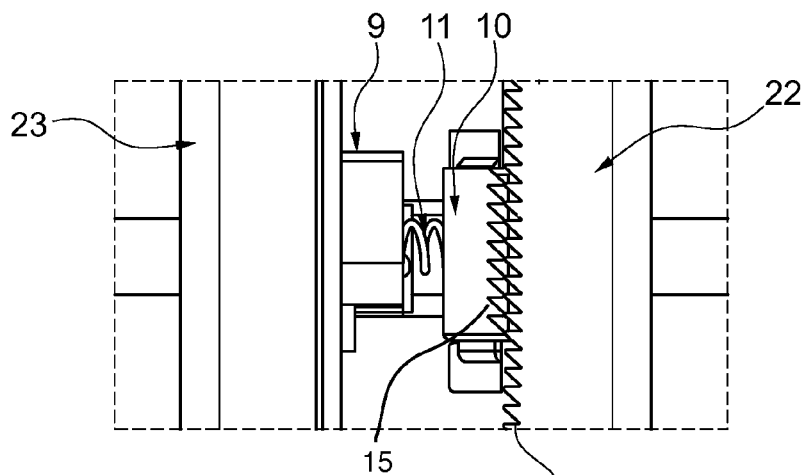
FIG. 8 shows the mechanism for blocking in depth in the tooth-on-tooth configuration when the tightening and blocking device is in locked position.

In the embodiment shown, the resilient means 11 is a compression spring 110. As shown in FIGS. 6 and 8, the compression spring 110 is arranged in order to exert a return force directed according to an axis substantially parallel to the tightening axis BB when the device for tightening is in locked position. It is of course obvious that the invention is not limited to such a resilient means and that any other member making it possible to exert a return force in the direction of the notched arrangement of the connection flange can be implemented without leaving the scope of the invention.

Advantageously, the movable cam 9 and the rack 10 comprise respectively a cam cone 90 and a rack cone 100 whereon the compression spring 110 is mounted. The cam cone 90 and the rack cone 100 constitute retaining means the spring in position between the movable cam 9 and the rack 10. This makes it possible as such to prevent the compression spring 110 from disengaging when the cam 9 rotates around the clamp screw 5 during the passage of the device for tightening from the locked position to the unlocked position.

Advantageously, the movable cam 9 is driven in rotation around the tightening axis BB by driving means arranged on the clamp screw 5. In the embodiment described, the clamp screw 5 has lugs 14, said lugs 14 forming the driving means the movable cam 9.

According to another embodiment not shown, the clamp screw 5 has a splined zone shaped for driving the movable cam whereon it is mounted.

In a driving situation, the control lever 7 is in locked position. Under the effort exerted by the device for tightening, the lateral risers 20 of the support unit 2 bear on either side on the upper body 1. Under the effort exerted by the lateral risers 20, the upper body 1, on connection flanges 22, 23, is deformed, as such surrounding the internal tube 4 mounted in the upper body 1. In this situation, the compression spring 110 maintains the axial teeth 15 of the rack 10 in contact with the teeth 13 arranged on the inner face 220 of the right connection flange 22. According to the axial position of the upper body 1 in the support unit 2, two "contact" configurations can occur, namely either a complete meshing of the teeth as shown in FIG. 6 or a "tooth-on-tooth" configuration as shown in FIG. 8.

Figure 7:
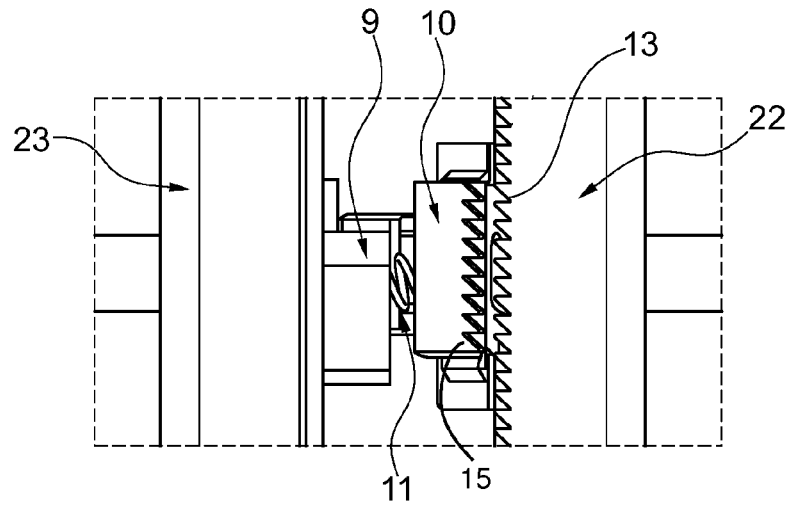
FIG. 7 shows the mechanism for blocking in depth when the tightening and blocking device is in unlocked position.

In an adjusting situation, the control lever 7 is placed in unlocked position, driving in rotation the clamp screw 5. The rotation of the control lever 7 in relation to the fixed cam 8 makes it possible to suppress the tightening tension of the upper body 1 on the internal tube 4. The lugs 14 then pivot the movable cam 9 around the clamp screw 5. By rotating, the contact surface 26 bears on the cam profile 16 in order to tip the rack 10 and the pad 12 along the clamp screw 5. The axial teeth 15 are then no longer in contact with the teeth 13 of the right connection flange 22 (FIG. 7). The upper body 1 can then slide freely in relation to the clamp screw 5 due to the presence of the oblong slots 16 and allow for the displacement in depth of the upper body 1. As shown in FIG. 7, the spring is maintained between the movable cam 9 and the rack 10 thanks to the presence of the cam cone 90 and of the rack cone 100.

Once the adjustment is made, the driver places the control lever 7 back into locked position. As indicated hereinabove, two cases can occur, namely a complete meshing of the teeth or the tooth-on-tooth configuration. In the case where the teeth 15 are completely meshed with the teeth 13, the rack 10 will prevent the displacement in depth of the upper body 1 in relation to the clamp screw 5 following the impact of the driver on the steering wheel. In the case of the tooth-on-tooth configuration, following an impact of the driver on the steering wheel, the upper body 1 will be displaced in depth until it reaches the position where the teeth 13 and the axial teeth 15 can be meshed and thanks to the pressure applied by the spring on the rack 10, the latter will mesh naturally.

The steering column described hereinabove is a steering column with adjustment solely in depth. It is of course obvious that those skilled in the art can also implement the blocking mechanism previously on a steering column that can be adjusted in inclination or adjustable in inclination and in depth by making structural modifications to its scope.

The invention is described in what precedes by way of example. It is understood that those skilled in the art are able to carry out various alternative embodiments of the invention without however leaving the scope of the invention.

The invention claimed is:

1. Steering column comprising:
an upper body defining a steering axis and wherein an internal tube is mounted,
two connection flanges arranged on either side of the upper body and connecting the upper body to a support element able to be fixed to a vehicle chassis and
a tightening and blocking device of the upper body in a position on the internal tube, the device comprising a clamp screw extending through the two connection flanges according to a tightening axis perpendicular to the steering axis, a set of cams comprising a movable cam mounted freely in translation along the clamp screw and a fixed cam, the movable cam being arranged to bear on an inner face of one of the two connection flanges as well as a rack able to cooperate with a notched arrangement provided on an inner face of the other of the two connection flanges, resilient means being arranged between the movable cam and the rack in order to exert on the rack a return force in a direction of the other of the two connection flanges bearing the notched arrangement.

2. Steering column according to claim 1, wherein the moveable cam and the rack comprise retaining means for retainingthe resilient means in a position between the movable cam and the rack.

3. Steering column according to claim 1, wherein the rack is provided with a maintaining pad in position on the inner face of the other connection flange bearing the notched arrangement, the maintaining pad bearing jointly on the internal tube and the upper body.

4. Steering column according to claim 1, wherein the clamp screw is controlled by means of a lever.

5. Steering column according to claim 1, wherein the clamp screw is controlled by means of an electric motor.

6. Steering column according to claim 1, wherein the resilient means is a compression spring.

7. Steering column according to claim 6, wherein the movable cam and the rack comprises respectively a cam cone and a rack cone whereon the compression spring is mounted, the cam cone and the rack cone forming the retaining means for retaining the compression of the spring in position.

8. Steering column according to claim 1, wherein the movable cam is driven in rotation around the tightening axis by driving means arranged on the clamp screw.

9. Steering column according to claim 8, wherein the driving means comprises at least one lug whereon the movable cam is mounted.

10. Steering column according to claim 8, wherein the driving means comprise a splined zone whereon the movable cam is mounted.

* * * * *